(12) United States Patent
Ashworth et al.

(10) Patent No.: US 11,223,415 B2
(45) Date of Patent: Jan. 11, 2022

(54) REPEATER WITH LOW POWER MODE FOR MOBILE OPERATIONS

(71) Applicant: Wilson Electronics, LLC, St. George, UT (US)

(72) Inventors: Christopher Ken Ashworth, Toquerville, UT (US); Nolan J. Bradshaw, Hurricane, UT (US); Dale Robert Anderson, Colleyville, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/882,265

(22) Filed: May 22, 2020

(65) Prior Publication Data
US 2020/0373995 A1    Nov. 26, 2020

Related U.S. Application Data

(60) Provisional application No. 62/852,888, filed on May 24, 2019.

(51) Int. Cl.
*H04B 7/155* (2006.01)
*H04B 7/185* (2006.01)
*H04W 52/02* (2009.01)

(52) U.S. Cl.
CPC ..... *H04B 7/15535* (2013.01); *H04B 7/18543* (2013.01); *H04W 52/0206* (2013.01)

(58) Field of Classification Search
CPC ..... H04W 52/00–0296; H04B 7/14–17; H04B 7/15535; H04B 7/18543
See application file for complete search history.

(56) References Cited

U.S. PATENT DOCUMENTS

| 4,776,032 A | 10/1988 | Odate et al. |
| 5,095,528 A * | 3/1992 | Leslie ............ H04B 7/15535 455/10 |

(Continued)

FOREIGN PATENT DOCUMENTS

| EP | 1525678 B1 | 7/2008 |
| GB | 2502143 | 11/2013 |

(Continued)

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

(Continued)

*Primary Examiner* — Raymond S Dean
(74) *Attorney, Agent, or Firm* — Thorpe North & Western, LLP.

(57) ABSTRACT

Technology for a mobile repeater operable to operate in a low power mode is disclosed. The repeater can comprise of detecting an uplink signal from one or more mobile devices for a selected period of time. The repeater can comprise of setting the mobile repeater to the low power mode when the uplink signal is not detected within the selected period of time to reduce a power draw. Wherein setting the mobile repeater to the low power mode comprises turning off one or more signal chain components in one or more signal chains including at least one power amplifier (PA) to reduce a power draw of the mobile repeater. Wherein the one or more signal chain components further comprises a low noise amplifier (LNA); a gain block; or a variable attenuator.

35 Claims, 12 Drawing Sheets

(56) References Cited

U.S. PATENT DOCUMENTS

| | | | |
|---|---|---|---|
| 5,303,395 A | 4/1994 | Dayani | |
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,052,646 A | 4/2000 | Kirkhart, II et al. | |
| 6,055,479 A | 4/2000 | Kirkhart, II et al. | |
| 6,059,843 A | 5/2000 | Kirkhart | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 8,849,187 B2 | 9/2014 | Van Buren et al. | |
| 10,236,921 B1 * | 3/2019 | Kohlhepp | H01Q 1/246 |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2005/0231042 A1 | 10/2005 | Kephart | |
| 2006/0084379 A1 | 4/2006 | O'Neill | |
| 2007/0071128 A1 | 3/2007 | Meir et al. | |
| 2007/0188235 A1 | 8/2007 | Dean | |
| 2007/0285053 A1 * | 12/2007 | Noguchi | H02J 7/32 320/114 |
| 2008/0031174 A1 | 2/2008 | Saifullah et al. | |
| 2008/0081555 A1 | 4/2008 | Kong et al. | |
| 2008/0096483 A1 | 4/2008 | Van Buren et al. | |
| 2008/0106391 A1 * | 5/2008 | Santavicca | B60R 25/24 340/426.36 |
| 2008/0278237 A1 | 11/2008 | Blin | |
| 2011/0151775 A1 | 6/2011 | Kang et al. | |
| 2011/0201393 A1 * | 8/2011 | Gautier | H03G 3/32 455/575.4 |
| 2012/0099490 A1 | 4/2012 | Kummetz et al. | |
| 2017/0111864 A1 * | 4/2017 | Ashworth | H04W 52/0229 |

FOREIGN PATENT DOCUMENTS

| | | | | |
|---|---|---|---|---|
| GB | 2502143 A | * | 11/2013 | H04B 7/2606 |
| GB | 2559819 | | 8/2018 | |
| WO | WO 2017/215634 A1 | | 12/2017 | |

OTHER PUBLICATIONS

ADL5513; "1 MHz to 4 GHz, 80 dB Logarithmic Detector/Controller"; Data Sheet; (2008); 12 pages; Analog Devices, Inc.

HMC713LP3E; "54 dB, Logarithmic Detector / Controller, 50-8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; (2001); Data Sheet; 218 pages.

* cited by examiner

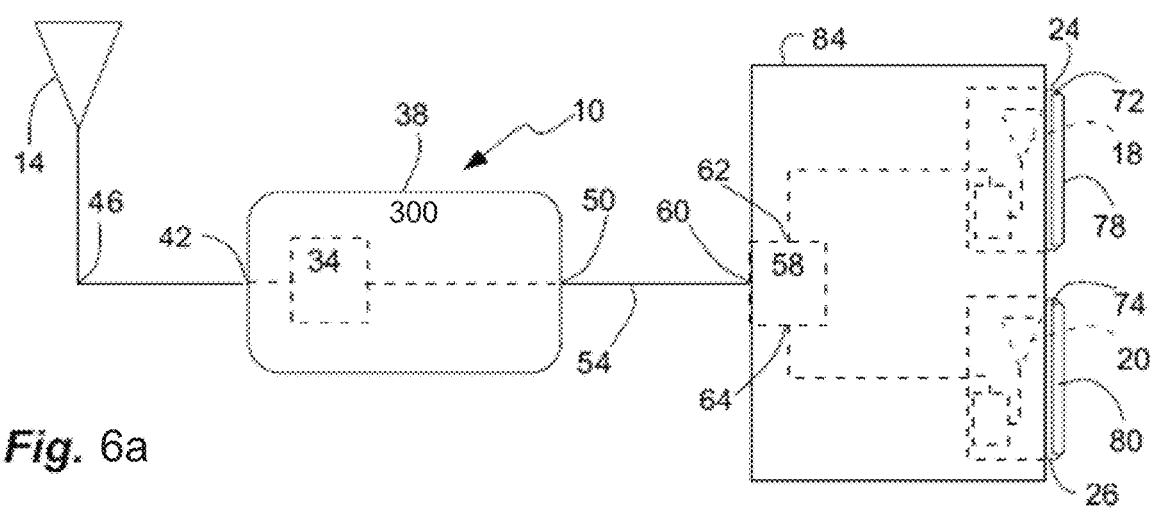
*Fig.* 6a
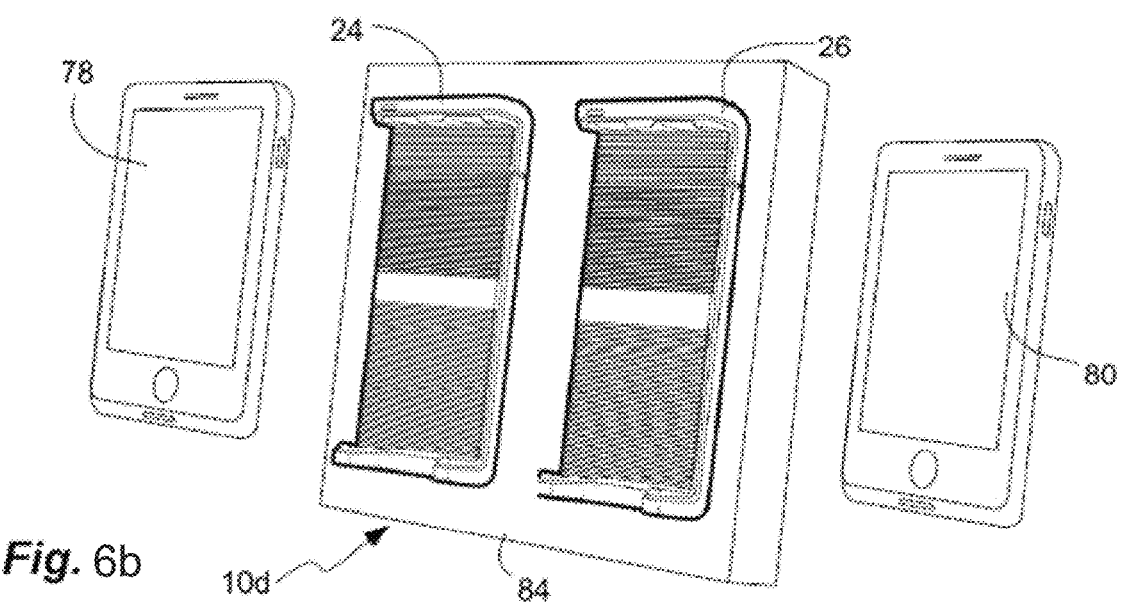
*Fig.* 6b
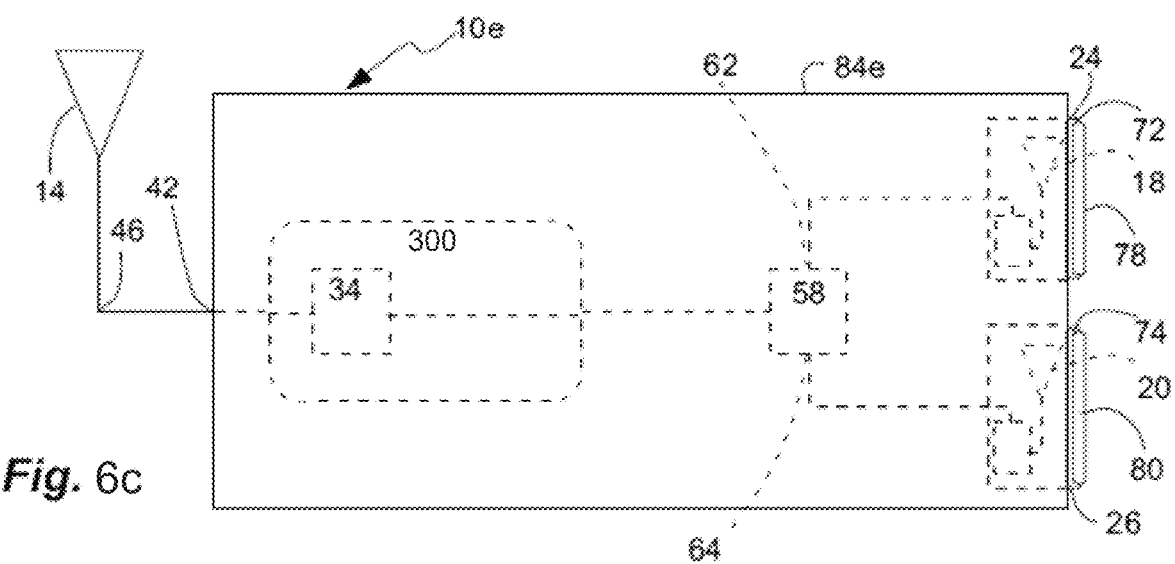
*Fig.* 6c

REPEATER WITH LOW POWER MODE FOR MOBILE OPERATIONS

RELATED APPLICATIONS

The present application claims the benefit of U.S. Provisional Patent Application No. 62/852,888, filed May 24, 2019 with a docket number of 3969-139.PROV, the entire specification of which is hereby incorporated by reference in its entirety for all purposes.

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink (UL) and downlink (DL) signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6a is a schematic view of a repeater system in accordance with an example;

FIG. 6b is a perspective view of cradles of the repeater system of FIG. 6a, with first and second wireless user devices removed from the cradles in accordance with an example;

FIG. 6c is a schematic view of a repeater system in accordance with another example;

Figure 1:
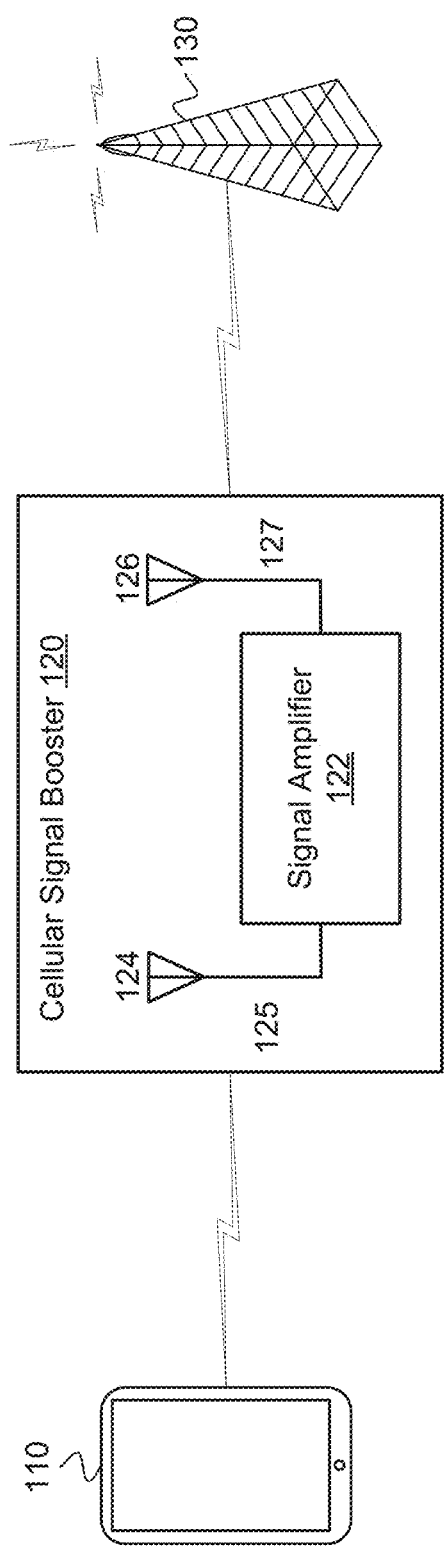
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

For purposes of the present invention, the following definitions are provided. The terms "cellular" and "cellular network" refer to a wireless telephone network that connects radio transmissions between a mobile phone and a system of multiple cell sites, each including an antenna and a base station, to a mobile telephone switching office, and ultimately to the public wire line telephone system. Cellular calls are transferred from base station to base station as a user travels from cell to cell. One of skill in the art can appreciate that embodiments of the invention can be applied to other wireless networks including those operating on various frequencies throughout the electromagnetic spectrum.

By way of example, the phrase "cell phone" or "cellular phone" refer to a wireless device that sends and receives messages using radio frequency signals in the appropriate band. Likewise, as used herein, the phrase "cellular signal" refers to signals being transmitted in spectrum allocated for cellular communications, such as the third generation partnership project (3GPP) long term evolution (LTE) bands 1-85. One of skill in the art can appreciate that embodiments of the invention are not limited to operation in these frequency spectrums, but can be applied in other portions of the frequency spectrum as well. In addition, other wireless devices such as personal digital assistants, laptop computers, and the like can benefit from or be incorporated into embodiments of the invention.

"Cell site" and "base station" are used herein interchangeably. Cell site and base station are defined as the location where the wireless network antenna and communications equipment is placed. A cell site or base station typically includes a transmitter/receiver, antenna tower, transmission radios and radio controllers for maintaining communications with mobile handsets within a given range.

A cell phone or cellular device may represent one or more such devices. Similarly, base station or cell site can refer to one or more base stations. Cell phone may also represent other devices that communicate through the amplifier. Embodiments of the amplifier, for example, may amplify signals for one or more cell phones in communication with one or more base stations.

The phrase "uplink signal" refers to the transmission path of a signal being transmitted from a handset to a base station. The phrase "downlink signal" refers to the transmission path of a signal being transmitted from the base station to the handset. The phrases "uplink signal" and "downlink" signal are not limited to any particular type of data that may be transmitted between a handset and a base station, but instead are simply used to specify the direction in which a signal is being transmitted.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Cellular repeaters are often used in vehicles to enable wireless user devices to communicate with base stations while traveling in a vehicle through remote areas or other areas with low power cellular signals. The cellular repeaters are typically powered using a vehicle power supply, such as a cigarette lighter adapter (CLA) connected to a car's 12 volt battery. Vehicles are evolving to include more and more electronics within the vehicle. In addition, people are bringing more external electronics into vehicles and powering them. For example, cell phones, tablets, and laptops are often charged in a vehicle. To accommodate the need for additional charging, vehicle manufacturers are providing more means for connecting to a vehicle's power supply. In some vehicles, the power supply connections are designed to stay on, even when the vehicle is turned off. This can be beneficial to powering digital devices. Some types of digital devices can have a fairly low current draw. However, other types of devices, such as some types of cellular repeaters, can have a fairly high current draw. It can be beneficial to reduce the current draw to a vehicle when the vehicle is turned off.

In one example, the power level of the vehicle can be identified to determine if the vehicle is active (i.e. the vehicle is charging or providing current from the vehicle alternator) or inactive (i.e. the vehicle is not charging or providing current). A cellular repeater, such as a mobile repeater, can be configured to be placed in a low power mode for mobile operations when a vehicle is inactive. The mobile repeater can be a dual band repeater, a multiple band repeater, or a single band repeater.

FIG. 1 illustrates an exemplary signal booster 120 in communication with a wireless device 110 and a base station 130. The signal booster 120 (also referred to as a cellular signal amplifier, a cellular repeater, or a repeater) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be configured as a mobile booster that is attached to a mobile object, such as a vehicle, marine vehicle, or a wireless device 110.

In one configuration, the signal booster 120 can include a server antenna 124 (e.g., an inside antenna or device antenna or a coupling antenna) and a donor antenna 126 (e.g., an outside antenna or node antenna). The server antenna 124 and/or the donor antenna can be integrated. The donor antenna 126 can receive the downlink signal from the base station 130. The downlink signal can be provided to the signal amplifier 122 via a second coaxial cable 127 or other type of radio frequency connection operable to communicate radio frequency signals, such as a fiber optic cable or twisted shielded pair cable. The signal amplifier 122 can include one or more cellular signal amplifiers for amplification and filtering. The downlink signal that has been amplified and filtered can be provided to the server antenna 124 via a first coaxial cable 125 or other type of radio frequency connection operable to communicate radio frequency signals. The server antenna 124 can wirelessly communicate the downlink signal that has been amplified and filtered to the wireless device 110.

Similarly, the server antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the donor antenna 126 via the second coaxial cable 127 or other type of radio frequency connection operable to communicate radio frequency signals. The donor antenna 126 can communicate the uplink signal that has been amplified and filtered to a node, such as base station 130.

In one example, the signal booster 120 can send uplink signals to a node and/or receive downlink signals from the node. While FIG. 1 shows the node as a base station 130, this is not intended to be limiting. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the repeater 30 or signal booster can be a Federal Communications Commission (FCC)-compatible consumer signal booster. As a non-limiting example, the repeater 30 or signal booster can be compatible with FCC Part 20 or 47 Code of Federal Regulations (C.F.R.) Part 20.21 (Mar. 21, 2013). In addition, the repeater 30 or signal booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R.

The repeater 30 or signal booster can be configured to automatically self-monitor its operation to ensure compliance with applicable noise and gain limits. The repeater 30 or signal booster can either self-correct or shut down automatically if the signal booster's operations violate the regulations defined in 47 CFR Part 20.21.

In one configuration, the repeater 30 or signal booster can improve the wireless connection between the wireless user devices 78 and 80 and the base station (e.g., cell tower) or another type of wireless wide area network (WWAN) access point (AP). The repeater 30 can boost signals from the Third Generation Partnership Project (3GPP) Technical Specification (TS) 36.101 (Release 16 Jan. 2019) bands or LTE frequency bands. For example, the repeater 30 can boost signals from the LTE frequency bands: 2, 4, 5, 12, 13, 17, 25, and 26. In addition, the repeater 30 can boost selected frequency bands based on the country or region in which the repeater is used, including any of bands 1-85 or other bands, as disclosed in 3GPP TS 36.104 V16.0.0 (January 2019).

In another configuration, the repeater 30 can boost signals from the 3GPP Technical Specification (TS) 38.104 (Release 15 Jan. 2019) bands or 5G frequency bands. In addition, the repeater 220 can boost selected frequency bands based on the country or region in which the repeater is used, including any of bands n1-n86, n257-n261, or other bands, as disclosed in 3GPP TS 38.104 V15.4.0 (January 2019).

The number of LTE frequency bands and the level of signal improvement can vary based on a particular wireless user device, cellular node, or location. Additional domestic and international frequencies can also be included to offer increased functionality. Selected models of the repeater 30 or signal booster can be configured to operate with selected frequency bands based on the location of use. In another example, the repeater 30 or signal booster can automatically sense from the wireless user devices 78 and 80 or base station (or GPS, etc.) which frequencies are used, which can be a benefit for international travelers.

Figure 2:
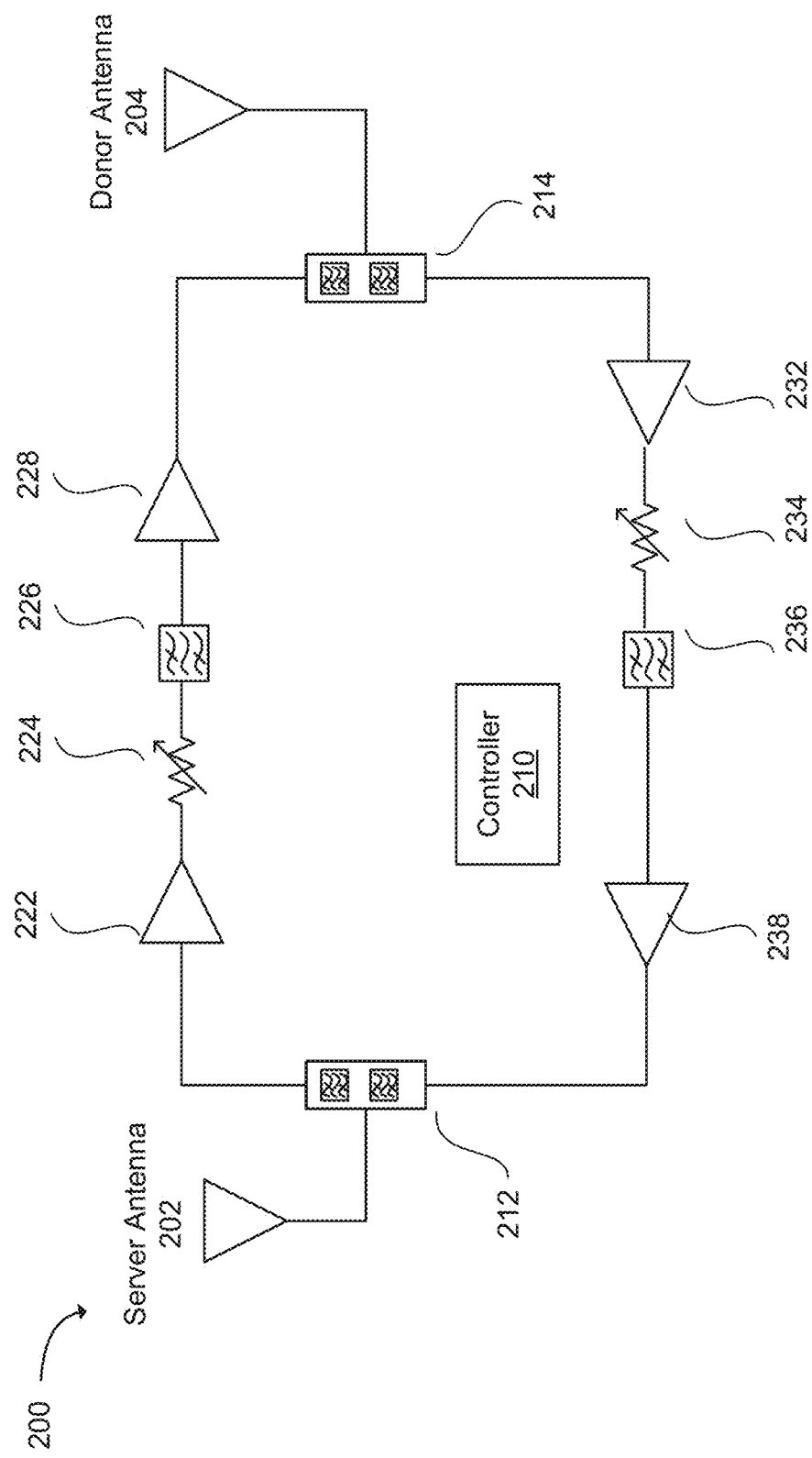
FIG. 2 illustrates a bi-directional amplifier in accordance with an example.

FIG. 2 shows a more detailed drawing of a repeater. The repeater can be configured to be coupled to a server antenna 202 and a donor antenna 204. The server antenna can be coupled to a diplexer or duplexer 212. The donor antenna can be coupled to a diplexer or duplexer 214. A first direction amplification and filtering path 230 and a second direction amplification and filtering path 240 can be coupled between the diplexer or duplexers 212, 214. The first direction amplification and filtering path 230 can comprise a low noise amplifier (LNA) 222, a variable attenuator 224, a filter 226, such as a bandpass filter, and a power amplifier (PA) 228. The LNA 222 can amplify a low power signal with minimal degradation of the signal to noise ratio of the low power signal. The PA 228 can adjust and amplify the power level of the low power signal by a desired amount. The PA can be comprised of an amplifier chain that can include one or more amplifiers configured to apply a gain to signals received by the amplifier chain. The second direction amplification and filtering path 240 can comprise an LNA 232, a variable attenuator 234, a filter 236, and a PA 238 that can be comprised of an amplifier chain. The first direction amplification and filtering path 230 can be a downlink amplification path or an uplink amplification path. The second direction amplification and filtering path 240 can be a downlink amplification path or an uplink amplification path. The repeater 200 can also comprise a controller 210. In one example, the controller 210 can include one or more processors and memory.

If included in the repeater 200, the controller 200 can be implemented by any suitable mechanism, such as a program, software, function, library, software as a service, analog or digital circuitry, or any combination thereof. The controller 200 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the amplifier chain. For example, the adjustments can be based on radio frequency (RF) signal inputs.

The memory can include any suitable computer readable media configured to retain program instructions and/or data for a period of time. By way of example, and not limitation, such computer readable media can include tangible computer readable storage media including random access memory (RAM), read only memory (ROM), electrically erasable programmable read only memory (EEPROM), a compact disk (CD) ROM or other optical disk storage, magnetic disk storage or other magnetic storage devices, flash memory devices (e.g., solid state memory devices) or any other storage medium which can be used to carry or store desired program code in the form of computer executable instructions or data structures and which can be accessed by a general purpose or special purpose computer. Combinations of the above can also be included within the scope of computer readable media. Computer executable instructions can include, for example, instructions and data that cause a general purpose computer, special purpose computer, or special purpose processing device to perform a certain function or group of functions.

Figure 3:
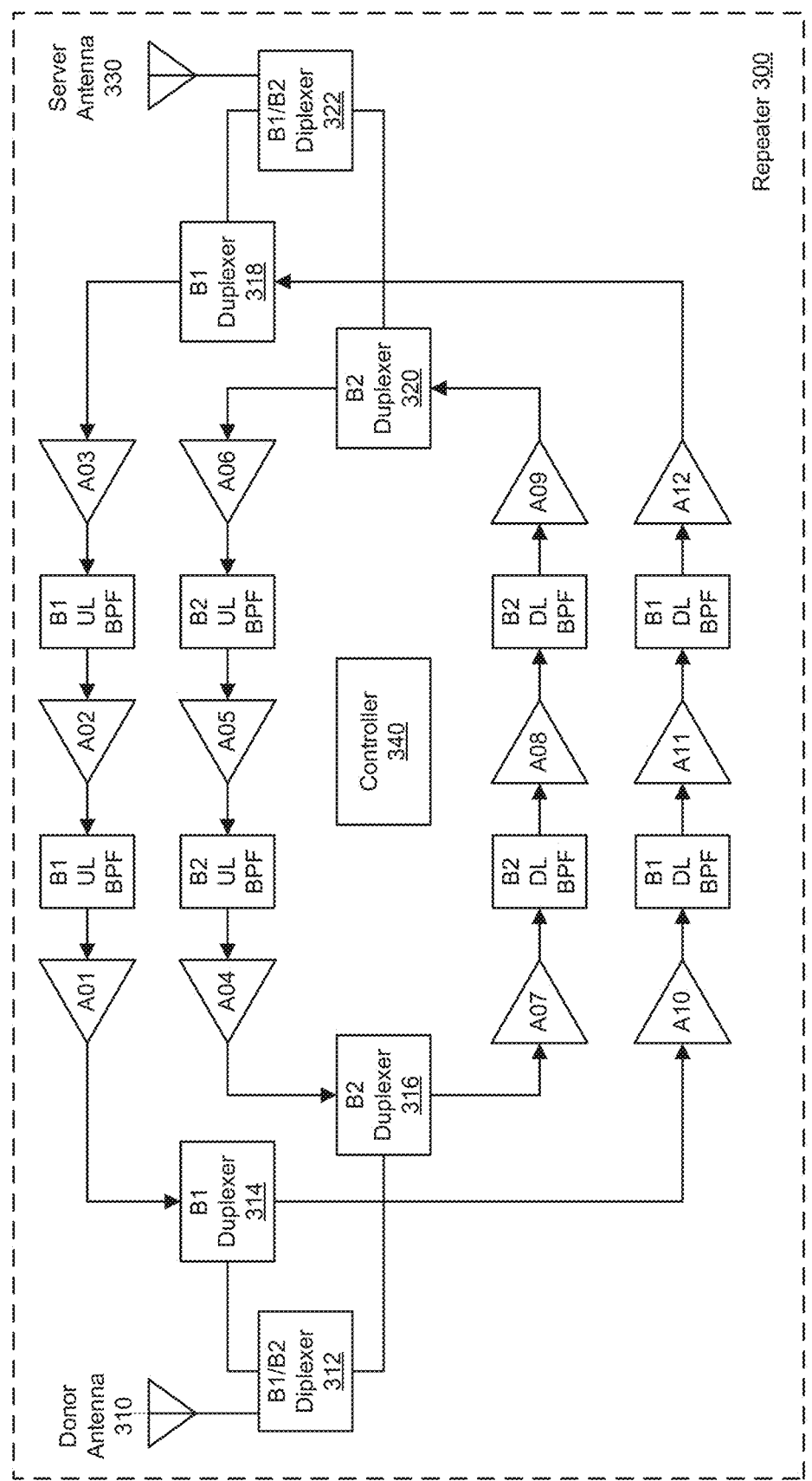
FIG. 3 illustrates a multi-band bi-directional amplifier in accordance with an example.

FIG. 3 provides an example illustration of a multiband repeater 300. The multiband bi-directional wireless repeater 300 can be configured to amplify an uplink signal and a downlink signal in multiple bands using a separate signal path for each uplink frequency band and downlink frequency band. In one embodiment, adjacent bands can be included on a same signal path. In one example, the repeater can be configured to be coupled to a donor antenna 310 and a server antenna 330.

The donor antenna 310, or node antenna, can receive a downlink signal. For example, the downlink signal can be received from a base station. The downlink signal can be provided to a first B1/B2 diplexer 312, wherein B1 represents a first frequency band and B2 represents a second frequency band. The B1 and B2 frequency bands are used generically in this example and do not represent a specific 3GPP frequency range. The first B1/B2 diplexer 312 can direct selected portions of a received signal to a B1 downlink signal path and a B2 downlink signal path. Therefore, a downlink signal that is associated with B1 can travel along the B1 downlink signal path to a first B1 duplexer 314. A portion of the received signal that is within the B2 band can travel along the B2 downlink signal path to a first B2 duplexer 316. After passing the first B1 duplexer 314, the downlink signal can travel through a series of amplifiers (e.g. A10, A11, and A12) and downlink bandpass filters (BPF) to a second B1 duplexer 318. In addition, the B2 downlink signal passing through the B2 duplexer 316, can travel through a series of amplifiers (e.g. A07, A08, and A09) and downlink band pass filters (BPF) to a second B2 duplexer 320. At this point, the downlink signals (B1 or B2) have been amplified and filtered in accordance with the type of amplifiers and BPFs included in the multiband bi-directional wireless signal booster 300. The downlink signals from the second B1 duplexer 318 or the second B2 duplexer 320, respectively, can be provided to a second B1/B2 diplexer 322. The second B1/B2 diplexer 322 can direct the B1/B2 amplified downlink signal to the server antenna 330. The server antenna 330 can communicate the amplified downlink signal to a wireless device, such as a user equipment (UE).

In another example, the server antenna 330 can receive an uplink (UL) signal from a wireless device. The uplink signal can include a Band 1 signal and a Band 2 signal. The uplink signal can be provided to the second B1/B2 diplexer 322. The second B1/B2 diplexer 322 can direct the signals, based on their frequency, to a B1 uplink signal path and a B2 uplink signal path. Therefore, an uplink signal that is associated with B1 can travel along the B1 uplink signal path to a second B1 duplexer 318, and an uplink signal that is associated with B2 can travel along the B2 uplink signal path to a second B2 duplexer 320. The second B1 duplexer 318 can direct the B1 uplink signal to travel through a series of amplifiers (e.g. A01, A02, and A03) and uplink bandpass filters (BPF) to the first B1 duplexer 314. In addition, the second B2 duplexer 320 can direct the B2 uplink signal to travel through an amplifier chain comprising a series of amplifiers (e.g. A04, A05, and A06) and downlink band pass filters (BPF) to the first B2 duplexer 316. At this point, the uplink signals (B1 and B2) have been amplified and filtered in accordance with the type of amplifiers and BPFs included in the bi-directional wireless repeater 300. The uplink signals from the first B1 duplexer 314 and the first B2 duplexer 316, respectively, can be provided to the first B1/B2 diplexer 312. The first B1/B2 diplexer 312 can direct the B1 and B2 amplified uplink signals to the donor antenna 310. The donor antenna 310 can communicate the amplified uplink signals to a base station.

Figure 4:
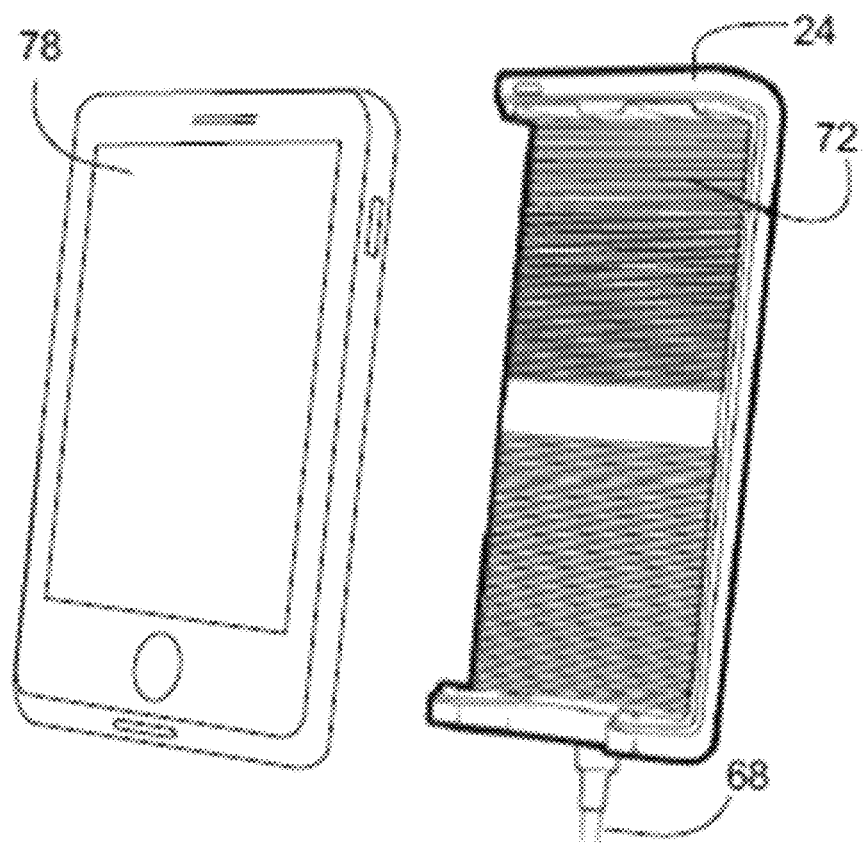
FIG. 4 is a perspective view of a cradle of a repeater system, with a wireless user device, namely a cellular phone, removed from the cradle, in accordance with an example.
Figure 5:
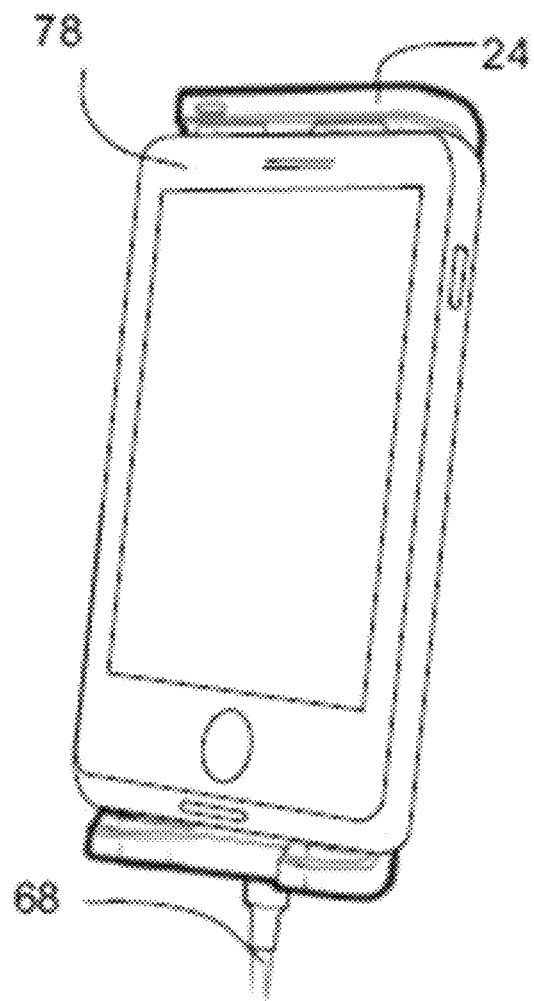
FIG. 5 is a perspective view of the cradle of a repeater system, with the wireless user device or the cellular phone carried by the cradle, in accordance with an example.

A repeater designed for a mobile vehicle can be configured to be attached to a vehicle mount or cradle that is designed to carry one or more wireless user devices. FIG. 4 and FIG. 5 depict a perspective view of a cradle 24 configured to be coupled to a repeater. The cradle is illustrated with a wireless user device 78, namely a cellular phone. The wireless user device 78 can be carried by the cradle 24 and removed from the cradle 24. A radio frequency connection 68 can be used to couple the cradle 24 to the repeater system. The repeater system can boost or amplify one or more radio frequency (RF) communication signals between a donor antenna and one or more server antennas. The donor antenna can be an exterior donor antenna disposed outside of a vehicle or structure. In one aspect, the server antenna can be an RF signal coupler carried by and disposed in the cradle 24.

The repeater system can comprise a repeater, the mobile device cradle 24 with one or more server antennas configured as RF signal couplers, and the donor antenna. The repeater can comprise a bi-directional amplifier (BDA) to amplify the one or more RF communication signals in a first direction and a second direction. The repeater can improve the quality of wireless communication and the one or more RF communication signals by amplifying, filtering, and/or applying other processing techniques via the BDA. The mobile device cradle can be disposed in a desired location, such as inside a vehicle, RV, marine vehicle (i.e. boat) or the like. The repeater can include a donor port configured to be coupled to the donor antenna. In one aspect, the donor port can be a co-axial coupler or other type of RF cable 68 operable to couple to the donor antenna, or other type of radio frequency connection operable to communicate radio frequency signals. The repeater can also have a server port. The server port can be operatively coupled to the repeater. In one aspect, the server port can be coupled to the RF cable 68 that is coupled to the mobile device cradle 24. In another aspect, the server port can be configured to provide an electrical connection between the repeater and the mobile device cradle 24. Additionally, the RF cable 68, or another cable, can be configured to be coupled to a power supply, such as the CLA, in order to receive power from a vehicle, to be supplied to the mobile device cradle 24.

The mobile device cradle 24 can have an interface 72, respectively, capable of selectively carrying a wireless user device 78. As described above, the wireless user devices 78 can be cellular phones, hot spots, such as jetpacks or MiFi, laptop computers, tablet computers, etc. The interface 72 can removably receive, hold and carry the wireless user device 78. The interface 72 can be sized and shaped to hold and grip the wireless user device 78. In one aspect, the interfaces 72 can comprise opposite fingers, sides or ends that are movable with respect to one another and biased towards one another to clamp the wireless user device 78 there between.

In one embodiment the mobile device cradle 24 can also have one or more integrated server antennas configured as signal to wirelessly couple the one or more RF communication signals to the wireless user devices 78 when carried by the mobile device cradle 24. In one aspect, a back of the interface 72 can abut to the wireless user devices 78, to space the wireless user device 78 with respect to the RF signal couplers or the server antennas. In another aspect, fingers, sides or ends can align, or position and orient, the wireless user device 78 with respect to the RF signal couples or server antennas.

FIGS. 6*a*-6*c* depict an example of a repeater system 10 or signal booster configured to carry two or more wireless user devices 78, 80. The repeater system 10 can boost or amplify one or more radio frequency (RF) communication signals between a donor antenna port 42 configured to be coupled to a donor antenna 14 and one or more server antenna ports 62, 64, configured to be coupled to server antennas, such as first and second server antennas 18 and 20, respectively. The donor antenna 14 can be an exterior donor antenna disposed outside of a vehicle. In one aspect, the server antennas 18 and 20 can be first and second RF signal couplers carried by and disposed in first and second cradles 24 and 26 associated with the repeater system 10.

The repeater system 10 can comprise a repeater 30, the first and second cradles 24 and 26 with the first and second server antennas 18 and 20 configured as first and second RF signal couplers, and the donor antenna 14. Alternatively, the donor antenna can be separate from the repeater system 10. The repeater 30 can comprise a bi-directional amplifier (BDA) 34 having at least a first direction amplification and filtering path and a second direction amplification and filtering path, as illustrated in FIGS. 2 and 3, configured to amplify the one or more RF communication signals. The repeater 30 can be single band or multiband, a frequency division duplex (FDD) repeater, a time division duplex (TDD) repeater, or a combined FDD/TDD repeater. The repeater can improve the quality of wireless communication of the one or more RF communication signals by amplifying, filtering, and/or applying other processing techniques via the BDA 34. The repeater 30 can be disposed in a desired location, such as inside an RV, vehicle, marine vehicle, or the like.

The repeater 30 includes a donor port 42 coupled to the BDA 34. The donor port is configured to enable the donor antenna 14 to be coupled to the repeater 30. In one aspect, the donor port 42 can be a co-axial coupler carried by the housing 38 and coupled to a co-axial cable 46 associated with the donor antenna 14, or other type of radio frequency connection operable to communicate radio frequency signals. The repeater 30 can also have a server port 50. The server port 50 can be communicatively coupled to the BDA 34. In one aspect, the server port 50 can be a co-axial coupler carried by the housing 38 and coupled to one or more co-axial cables 54 associated with the cradles 24 and 26, or the signal splitter 58 described below. In another aspect, the server port 50 can be an electrical connection between the repeater 30 and external devices, such as the cradles 24 and 26 or a similar device having one or more RF coupling antennas configured to couple to a user device antenna, a direct connect device, or a server antenna, via the signal splitter 58.

The signal splitter 58 is communicatively coupled to the repeater 30. In one aspect, the signal splitter 58 can be coupled to the server port 50. In another aspect, the signal splitter 58 can be integrated into the repeater 30. The signal splitter 58 can have first and second signal splitter ports 62 and 64, respectively. The first and second signal splitter ports 62 and 64 can be first and second server ports, or the signal splitter 58 can split the server port 50 into first and second server ports. In one aspect, the first and/or second signal splitter ports 62 and 64 can be co-axial couplers carried by the signal splitter 58, or housing thereof, and coupled to co-axial cables 68 and 69 associated with the cradles 24 and 26, or other type of radio frequency connection operable to communicate radio frequency signals. In another aspect, the first and/or second signal splitter ports 62 and 64 can be electrical connections between the signal splitter 58 and the cradles 24 and 26, or electrical components thereof, such as the antennas 18 and 20.

The signal splitter 58 can direct the one or more RF communication signals between the first and second signal splitter ports 62 and 64, the first and second cradles 24 and 26, and the first and second server antennas 18 and 20 or the first and second RF signal couplers 62, 64. In one aspect, the signal splitter 58 can evenly divide the one or more RF communication signals. The signal splitter 58, and the repeater 30, can be configured so that signal measured at the signal splitter 58 has a predetermined maximum gain at the first and/or second signal splitter ports 62 and 64, relative to the signal at the input port, such as port 42. For example, the signal splitter 58, and the repeater 30, can be configured to provide a maximum gain of 23 dB at the first and second antennas 18 and 20 or at the first and second RF signal splitter ports 62, 64, and/or at the first and second cradles 24 and 26. One or more additional amplifiers, repeaters, attenuators, variable attenuators, or filters may be included in the signal path to provide the desired signal gain at the splitter ports 62, 64 or the signal paths 68, 69 from the signal ports 62, 64.

FIGS. 6a and 6b depict an example in which the repeater system 10 has a single cradle housing 84 comprising the first and second cradles 24 and 26, the first and second interfaces 72 and 74, and the signal splitter 58. The first and second cradles have a single, shared cradle housing 84. Thus, the cradles 24 and 26 or the interfaces 72 and 74 can be commonly located. For example, the cradle housing 84, or the first and second cradles 24 and 26 and the first and second interfaces 72 and 74, can be affixed to the dashboard or console in the vehicle between the driver's seat and the passenger's seat for ease of access by both the driver and the passenger. In addition, the first and second cradles 24 and 26, or the first and second server antennas 18 and 20 thereof, can be equidistance from the server port 50 of the repeater 30. Thus, the power of the one or more RF communication signals can be substantially the same at the first and second cradles 24 and 26, or the first and second server antennas 18 and 20 thereof. However, this is not necessary. Different length cables can be used that can result in unequal power delivered to the cradles 24 and 26.

FIG. 6c depicts another example of a repeater system 10e in an example of the invention which is similar in many respects to those described above, and which descriptions are hereby incorporated herein by reference. The repeater system 10e has a single, shared housing 84e comprising the first and second cradles 24 and 26, the first and second interfaces 72 and 74, the repeater 30, and/or the signal splitter 58. The housing 84e, and thus the cradles 24 and 26 or the interfaces 72 and 74, and the repeater 30, can be commonly located. In addition, the signal splitter 58 can be integrated with the repeater 30, as described above. The cradles 24 and 26 illustrated in FIGS. 6a-6c can also be direct connect devices.

Figure 6D:
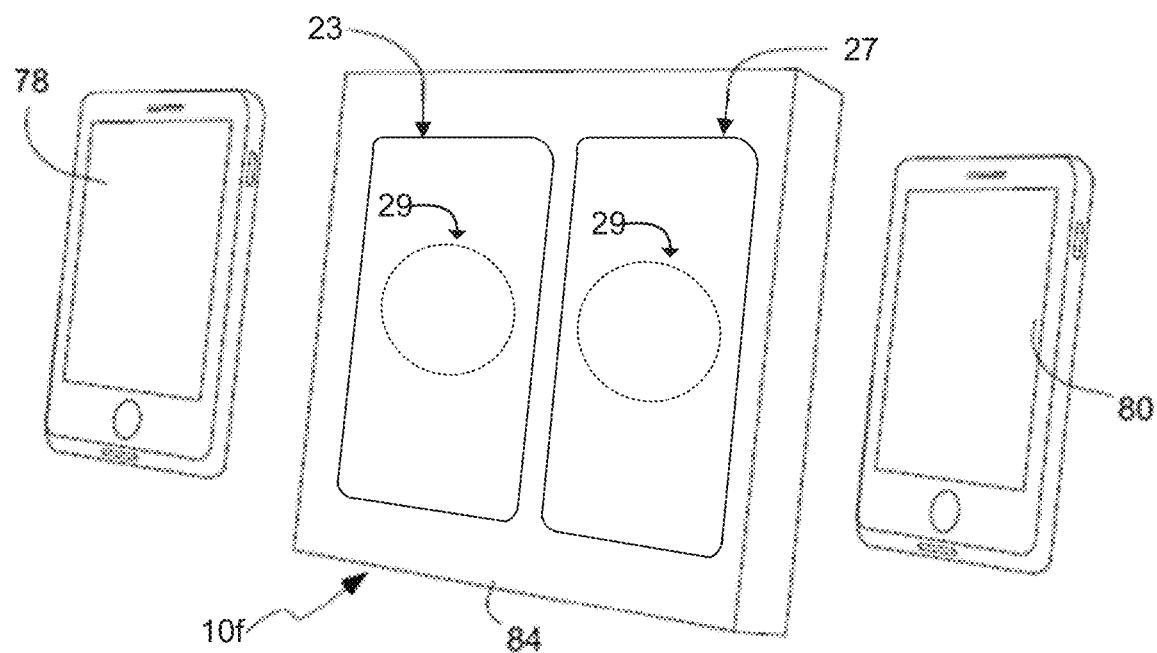
FIG. 6d is a perspective view of a cradle of the repeater system of FIG. 6a with first and second wireless user devices not located on the cradle in accordance with an example.

FIG. 6d depicts another example of a repeater system 10f in a single cradle housing 84. In this example, instead of using the cradles 24 and 26, the cradle housing 84 can use other means for retaining the user devices 78 and 80. For example, user device retention areas 23 and 27 are configured to retain the user devices 78 and 80, respectively. The user device retention areas 23 and 27 can be substantially flat or concave. A surface adhesion material may be applied, such as a plastic, silicon, or rubber material to allow the user devices 78 and 80 to adhere to the retention areas 23 and 27. In one example a magnetic retention device 29 can be located behind a front surface of the single cradle housing 84. The magnetic retention device 29 can be a single magnet, or a material that includes two or more separate magnets. The magnets can adhere directly to the user devices 78 and 80 to retain the user devices. Alternatively, a second magnetic retention device can be configured to be applied to each user device 78, 80. The second magnetic retention device can be applied using an adhesive, or can be applied to another material, such as a case configured to retain a user device. The second magnetic retention device can magnetically mate with the magnetic retention device 29 to align each user device 78, 80 with a server antenna, such as the RF coupling antennas 18 and 20 illustrated in FIGS. 6a and 6c. Signals can be communicated between the repeater 30 and the coupling antennas 18 and 20 via the splitter 58, as previously discussed.

Regulatory groups, such as the FCC in the United States, limit the amount of gain a repeater, such as a cellular signal booster, can apply to a downlink signal. The amount of gain is determined based on the type of antenna or device in communication with a server antenna. The antenna or device that is communicatively coupled to the server port of the repeater can be referred to as a server antenna device. Server antenna devices can be categorized into groups, or classes, based on the amount of gain that can be applied for signals sent to devices in the group.

In one example, server antenna devices in a first server antenna device class are devices that are configured to receive the one or more RF communication signals with a signal gain of 15 decibels (dB) at a signal splitter path (i.e.

68 or 69) relative to the one or more RF communication signals at the donor port 42. This group can include direct connect devices.

A second server antenna device class is for server antenna devices that are configured to receive the one or more RF communication signals with a signal gain of 23 dB at the signal splitter path relative to the one or more RF communication signals at the donor port. Examples of devices in this group are devices, such as cradles, that have RF coupling antennas that are configured to couple to an antenna in a wireless user device.

A third server antenna device class is for server antenna devices that are configured to receive the one or more RF communication signals with a signal gain of 50 dB at the signal splitter path (68 or 69) relative to the one or more RF communication signals at the donor port. Examples of devices in this group are mobile server antennas configured for land or marine vehicles (i.e. boats).

A fourth server antenna device class is for server antenna devices that are configured to receive the one or more RF communication signals with a signal gain of 65 to 72 dB at the signal splitter path relative to the one or more RF communication signals at the donor port. Examples of devices in this group are stationary server antennas. The stationary server antennas can be located in buildings or stationary mobile vehicles such as trailers or mobile homes.

Figure 7A:
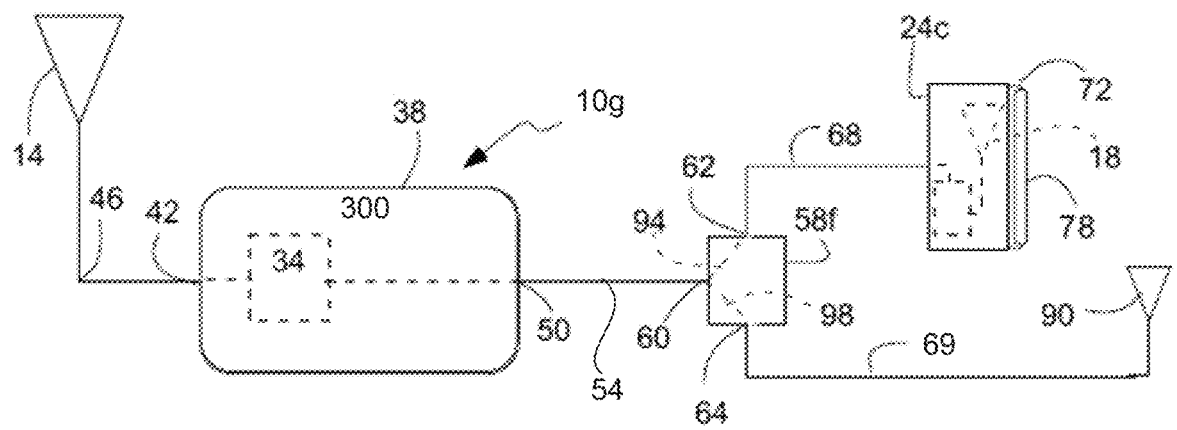
FIG. 7a is a schematic view of another repeater system in accordance with another example.

FIG. 7a depicts another example of a repeater system 10g in an example of the invention which is similar in many respects to those described above, and which descriptions are hereby incorporated herein by reference. The repeater system 10g can boost the one or more RF communication signals for both a cradle 24c and a server antenna 90. The server antenna 90 can have a greater power and a greater range than the cradle 24c. For example, a user can dispose a wireless user device 78 in the cradle 24c, while still providing a signal for others in the vehicle. The server antenna 90 can be coupled to the second signal splitter port 64 via a cable, such as coaxial cable 69. The cable 69 can have a different length than the cable 68 used to connect port 62 to the cradle 24c. In addition, the repeater system 10g can comprise a signal tap 58f. The signal tap 58f can split the one or more RF communication signals disproportionally between a coupled signal path 94 to the first signal splitter port 62, and a second signal path 98 to the second signal splitter port 64. The second signal path 98 can be a low-loss signal path. The signal tap 58f can provide a majority of the power of the one or more RF communication signals along the second signal path 98 while a smaller amount of the power of the one or more RF communication signals can be tapped off by the signal tap along the coupled path 94. The power of the one or more RF communication signals at the second signal splitter port 64 can be greater than the power of the one or more RF communication signals at the first signal splitter port 62. Thus, the server antenna 90 can be coupled to the second signal path 98. Again, the signal tap 58f, and the repeater 30, can be configured to provide a signal with a maximum gain of 23 dB at the first signal splitter port 62 or at the first cradle 24c relative to the signal at the donor port. In addition, the signal tap 58f, and the repeater 30, can provide a signal with a greater maximum gain at the second signal splitter port 64 or the server antenna 90, such as 50 dB or 65-72 dB, or another desired power level based on the application and regulatory requirements. The server antenna 90 can be located a greater distance from the repeater 30 than the cradle 24. In one aspect, the server antenna 90 can be an internal server antenna 90 and can be located inside an RV, and used when the RV is stationary. In another aspect, a variable attenuator can be included that can enable the output of the second signal splitter port 64 to be variable. For example, when an RV is moving, the repeater can be configured to provide a signal at the second signal splitter port 64 with a maximum gain of 50 dB relative to the signal at the donor port. When the RV is stationary, the repeater can provide a signal at the second signal splitter port with a maximum gain of 65 to 72 dB relative to the signal at the donor port, or another gain level based on a regulatory requirement where the repeater system 10g is located. In one aspect, the signal tap 58f can be separate from the repeater 30, and communicatively coupled to the repeater 30, such as by a co-axial cable 54, as shown. In one aspect, the cradle 24c can be a direct connect device configured to receive a signal with a gain of 15 dB. The gain can be measured at the port 62 or at the direct connect device. The location where the gain is measured can depend on the regulatory group governing the use of the repeater system 10g.

In one example, a repeater system can comprise a repeater 30 having a server port 50 and a donor port 42 that is configured to be coupled to a donor antenna 14. The repeater 30 can include a first direction amplification and filtering path 108 coupled between the donor port and the server port; and a second direction amplification and filtering path 110 coupled between the donor port and the server port, as illustrated in FIG. 1a. The repeater system can further comprise a signal splitter 58 communicatively coupled to the server port 50 and having at least first 62 and second 64 signal splitter ports. The signal splitter may be located internal to, or external from a housing 38 of the repeater 30.

A first signal splitter path 68 can be coupled to the first signal splitter port 62. A second signal splitter path 69 can be coupled to the second signal splitter port 64. The repeater system can be configured to receive one or more RF communications signals at the donor port 42, from the donor antenna 14. A selected amount of gain can be applied to the one or more RF communications signals at each of the signal splitter paths 68, 69. The amount of gain applied to signals at each signal splitter path can be determined, or predetermined, based on the server antenna device that is connected, or configured to be connected, to each signal splitter path. The amount of gain applied can be selected using a signal tap 58f. Additional amplifiers, attenuators, variable attenuators, or repeaters can also be used to reduce or increase gain at each signal splitter path to provide a desired amount of gain to a server antenna device communicatively coupled to a signal splitter port 62, 64 via a signal splitter path 68, 69.

Figure 7B:
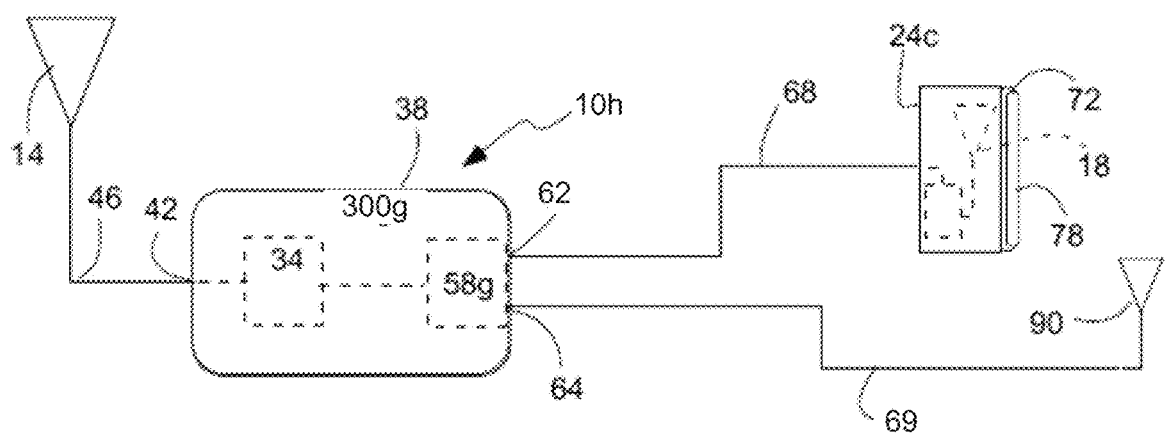
FIG. 7b is a schematic view of another repeater system in accordance with another example.

FIG. 7b depicts another example of a repeater system 10h in an example of the invention which is similar in many respects to those described above, and which descriptions are hereby incorporated herein by reference. The repeater 30g has the signal tap 58g integrated into the repeater 30g, or the housing 38 and electrical components thereof, and providing first and second server ports 62 and 64. In one aspect, the signal tap 58g can be disposed in the housing 38 along with the electrical components of the repeater 30g, such as the BDA 34. Thus, the signal tap 58g and the repeater 30g can share the housing 38, and the housing 38 can be a single shared housing. In another aspect, the signal tap 58g can be located with the other electrical components of the repeater 30g on one or more PCBs disposed in the housing 38. In one aspect, the gain can be measured at each server port 62 and 64 relative to the input signal at port 42.

The repeater 300 can draw a substantial amount of current. This can be especially true when the repeater is configured to amplify signals in multiple bands and is coupled to multiple server antenna devices and/or server antenna devices in multiple different server antenna device classes. For example, a repeater 300 configured to be installed in a motorhome can be configured to be coupled to a cradle 84 operating at the front of the motorhome. The cradle can include two server antennas 18, 20. A downlink signal with 23 dB of gain relative to the downlink signal at the donor port 42 can be sent to each server antenna in the cradle 84. An additional server antenna can be located in a cab of the motorhome. The server antenna 90 can receive downlink signals with a gain of 50 dB relative to the downlink signal at the donor port 42. This can allow wireless user devices to communicate in the cab while the motorhome is moving. An additional server antenna 90 can be located in the living quarters of the motorhome. This server antenna can receive downlink signals with a gain of 65-72 dB relative to the downlink signal at the donor port 42. The repeater 300 can include multiple amplifier chains for 5 or more bands in the uplink and downlink directions. Each of the amplifier chains in the repeater 300 and the mobile server antenna devices 24, 26, 90 can draw current at a selected voltage. This can lead to a substantial power draw on a battery of a vehicle.

In one embodiment, the repeater 300 and/or mobile server antenna devices 24, 84, 90 can be configured to be placed in a low power mode. When operating in a low power mode, the repeater and/or mobile server antenna devices can be configured to operate with a reduced current draw relative to operating in a full power mode. While operating in a low power mode, the repeater and mobile server antenna devices may offer reduced functionality. However, they can still allow a wireless user device 78 to communicate with a base station 130 via the repeater 300 while operating in the low power mode. Full functionality can be restored to the repeater 300 and/or mobile server antenna devices via a user interface with the repeater or by activating (turning on) the vehicle in which the repeater 300 is located.

In one embodiment, when the repeater 300 is set to a low power mode, selected settings of the repeater can be changed to reduce current draw at the repeater. The settings can be changed to turn off or reduce a power draw of one or more signal chain components in one or more signal chains including at least one power amplifier (PA) to reduce a power draw of the mobile repeater. The power draw can be reduced by: reducing a current to the one or more components, reducing a voltage to the one or more components, or cycling the voltage and/or current to the one or more components. The components can include one or more of a low noise amplifier (LNA), a gain block, a variable attenuator, a signal detector, a processor, a controller, an active component, or a memory.

In one embodiment, the repeater 300 can be configured to operate the first direction amplification and filtering paths and/or second direction amplification and filtering paths on a selected duty cycle to reduce current draw when the repeater and/or mobile server antenna devices 24, 84, 90 are in a low power mode. For example the first direction amplification and filtering path can be configured for an uplink signal from one or more user devices. The second direction amplification and filtering path can be configured for a downlink signal from a base station. The amplifiers in the signal chain can be powered a certain amount of time, such as 20% of each second, while being turned off for 80% of each second. The duty cycle percentage is provided as an example and is not intended to be limiting. The actual duty cycle can be selected to provide a desired reduction in current draw while enabling the wireless user device to maintain contact with a base station frequently enough to maintain a data link between the base station and the wireless user device. In one example, the signal chains for each band in the repeater for the UL and/or DL signal can be turned on for 1 milliseconds (ms) and off for 5 ms, or some other suitable predetermined time period that would be short enough that the power cycle and boosting capabilities of the repeater are not disrupted.

In one embodiment, the repeater 300 can be configured to enter a low power mode after a predetermined period of time after it is used. For example, it may enter a low power mode after a period of 5, 10, 20, 30, 45, 60, 90, or 120 minutes, or the like. In one example, the repeater 300 and/or mobile server antenna devices 24, 84, 90 can be configured to detect when an uplink signal is received from a user device to identify when the repeater is in use. The mobile repeater and/or mobile server antenna devices 24, 84, 90 can be set to the low power mode when the uplink signal is not detected within a selected or predetermined period of time to reduce a current draw.

Alternatively or simultaneously, repeater 300 and/or mobile server antenna devices 24, 84, 90 can be set to a low power mode to reduce a current draw when a downlink signal from a base station for a wireless user device is not detected within the selected period of time.

In one embodiment, the repeater 300 can detect an uplink signal having a power level greater than a selected threshold for a selected period of time, and set the repeater 300 to a full power mode when the uplink signal has the power level that is higher than the selected threshold for the selected period of time.

In another example, the repeater 300 can be configured to connect to a battery via a direct current (DC) power adapter. The DC power adapter can comprise but not be limited to, a CLA, a universal serial bus (USB) adapter, or an alternating current (AC) adapter. The DC power adapter can further be configured to determine when the battery is not being charged and send a signal to the mobile repeater to set the mobile repeater to the low power mode to reduce a power draw on the battery when the battery is not being charged. The DC adapter can further be configured to comprise one or more voltage adapter processors that can be configured to determine an average DC voltage at the DC power adapter.

In one embodiment, the voltage adapter processors can further be configured to determine an average DC voltage input. Accordingly, a voltage anomaly can further be identified when the voltage has increased over a selected voltage threshold, over a period of time that is greater than a predetermined threshold that is the average DC voltage. Additionally, the voltage adapter processors can determine that the battery is not being charged when the voltage anomaly does not occur for a first period of time. When the battery is not being charged during the first period of time, the voltage adapter processors can send a first charge indication to the mobile repeater to set the mobile repeater to a first low power mode to reduce a power draw on the battery when the battery is not being charged. Upon being set to a first low power mode the power adapter can be configured to send the charge indication to the mobile repeater from the power adapter to enable the mobile repeater to power one or more signal chain components, in one or more uplink signal chains or one or more downlink signal chains, of the mobile repeater. This setting can be established for a selected duty cycle to reduce a power draw of the mobile repeater on the battery when the battery is not being charged. In one embodiment, the first charge indication signal can be sent after a predetermined time period. The repeater 300 can be maintained at full power for a selected time after the voltage anomaly does not occur. For example, the first charge indication signal can be sent after 5, 10, 20, 30, 45, 60, 90, 120 minutes, or the like. The amount of time can be selected based on the type of battery that the repeater is connected to. A large batter may be able to power the repeater for hours. The selected time period may be relatively short, such as 15 minutes after the last voltage anomaly occurred. At that time, the first charge indication signal can be sent, as previously described.

Additionally, in a second instance where the battery has been determined to not have been charged, the voltage adapter processors can send a second charge indication to the repeater 300 to set the repeater to a second low power mode to reduce a power draw on the battery even further when the battery is not being charged. The power adapter, upon being configured to set the mobile repeater to a second low power mode, can be configured to send a second charge indication to the repeater from the power adapter after a second period of time that is greater than the first period of time. This configuration can be utilized to enable the repeater to turn off or reduce a power draw of one or more signal chain components in one or more uplink signal chains or one or more downlink signal chains of the mobile repeater, to further reduce a power draw of the mobile repeater on the battery when the battery is not being charged for the second period of time.

The voltage adapter processors can also be configured to identify, as a voltage anomaly, a voltage increase over a selected voltage change period of time that is greater than the average DC voltage by a predetermined voltage threshold. Additionally, the voltage adapter processors can be configured to determine that the battery is not being charged when the voltage anomaly does not occur for a selected voltage anomaly period of time. The voltage adapter processors can also be configured to send a voltage anomaly signal to the mobile repeater to set the mobile repeater to a voltage anomaly low power mode to reduce a power draw on the battery when the battery is not being charged.

When utilizing the voltage anomaly low power mode, the voltage anomaly low power mode can be configured to be different from the low power mode. Upon the mobile repeater being set to the voltage anomaly low power mode, the mobile repeater can receive the voltage anomaly signal at the mobile repeater from the DC voltage adapter. Additionally, the mobile repeater can power one or more signal chain components in one or more signal chains of the mobile repeater for a selected duty cycle to reduce a power draw of the mobile repeater on the battery when the battery is not being charged. Alternatively or simultaneously, the mobile repeater can turn off or reduce a power draw of one or more signal chain components in one or more signal chains of the mobile repeater to reduce a power draw of the mobile repeater on the battery when the battery is not being charged. The signal chain components can include but not be limited to a LNA, a power amplifier (PA), a gain block, a band pass filter, and an attenuator.

In one embodiment, a cradle 24, 26, 84 can be configured to detect a presence of a mobile device at the cradle and send a mobile device presence indication to the mobile vehicle repeater 300 to enable the mobile vehicle repeater to enter a low power mode to reduce a power draw of the mobile vehicle repeater when a mobile device is not in the cradle. A mobile device detector can also be configured to be coupled to the mobile device cradle. Further the mobile device detector can be configured to comprise one or more of a mechanical switch, an electrical switch, an optical sensor, infra-red (IR) sensor or a Hall Effect sensor. The usage of any of these can be utilized in order to indicate whether the mobile device is attached to the cradle, and the booster should be turned on. For example, in the case of the mechanical switch, when extended, an indication can be received or noticed that the phone is in the cradle, and the booster should be on and active for detection.

In one embodiment, the mobile device cradle 24, 26, 84 can be configured to support a mobile device cradle transmitter (MDCT), which can be coupled to the mobile device detector. The MDCT can be configured to send a signal to the mobile vehicle repeater to indicate that the mobile device is not at the mobile device cradle to enable the mobile vehicle repeater to enter a low power mode to reduce a power draw of the mobile vehicle repeater. The MDCT can be a wired transmitter, a wireless transmitter, or a processor.

In another embodiment the vehicle repeater 300, can be coupled to the mobile device cradle and configured to determine a presence of a mobile device detection signal received from a mobile device cradle 24, 26, 84 to identify when a mobile device is located at the mobile device cradle. When this determination is taking place, the mobile repeater can be configured to detect the mobile device detection signal configured to identify that the mobile device is not located at the mobile device cradle. Additionally, the mobile repeater can be configured to determine the mobile device detection signal is not received for a selected threshold period of time to identify that the mobile device is not present at the mobile device cradle.

In another embodiment, the repeater 300 can be configured to set the mobile repeater to a low power mode when the mobile device is not located at the mobile device cradle to reduce a power draw of the mobile repeater.

In one embodiment, the repeater 300 can be a mobile repeater system configured to transmit a mobile device detection signal from the repeater to an antenna coupled to the device cradle 24, 26, 84. The repeater 300 can also be configured to measure a return loss of the mobile device detection signal. The repeater 300 can also be configured to determine a presence of the mobile device at the device cradle 24, 26, 84 based on the return loss. Additionally, the repeater 300 can be configured to set the repeater to the low power mode when the mobile device 78, 80 is not present at the device cradle 24, 26, 84.

In one embodiment, the repeater 300 or mobile server antenna devices such as the mobile device cradle 84 or server antenna 90 can detect spikes in the vehicle power supply, such as a CLA port power supply or USB power supply. The spikes can be created by the operation of an alternator used to charge the vehicle battery. If there is a continuous number of power spikes at a selected frequency, the vehicle can be considered to be active. If there is a lack of a power spikes over a selected time period, the vehicle is inactive, and the repeater 300 and/or mobile server antenna devices 24, 26, 84, 90 can placed in a low power mode.

Accordingly, the repeater 300 and/or mobile server antenna devices 24, 26, 84, 90 can include detection circuitry. When the detection circuitry determines that the engine of the vehicle is not running, the repeater and/or mobile server antenna devices can enter a low power mode. When the engine is running, the repeater and/or mobile server antenna devices can be configured to operate in a full power operational mode.

Figure 8:
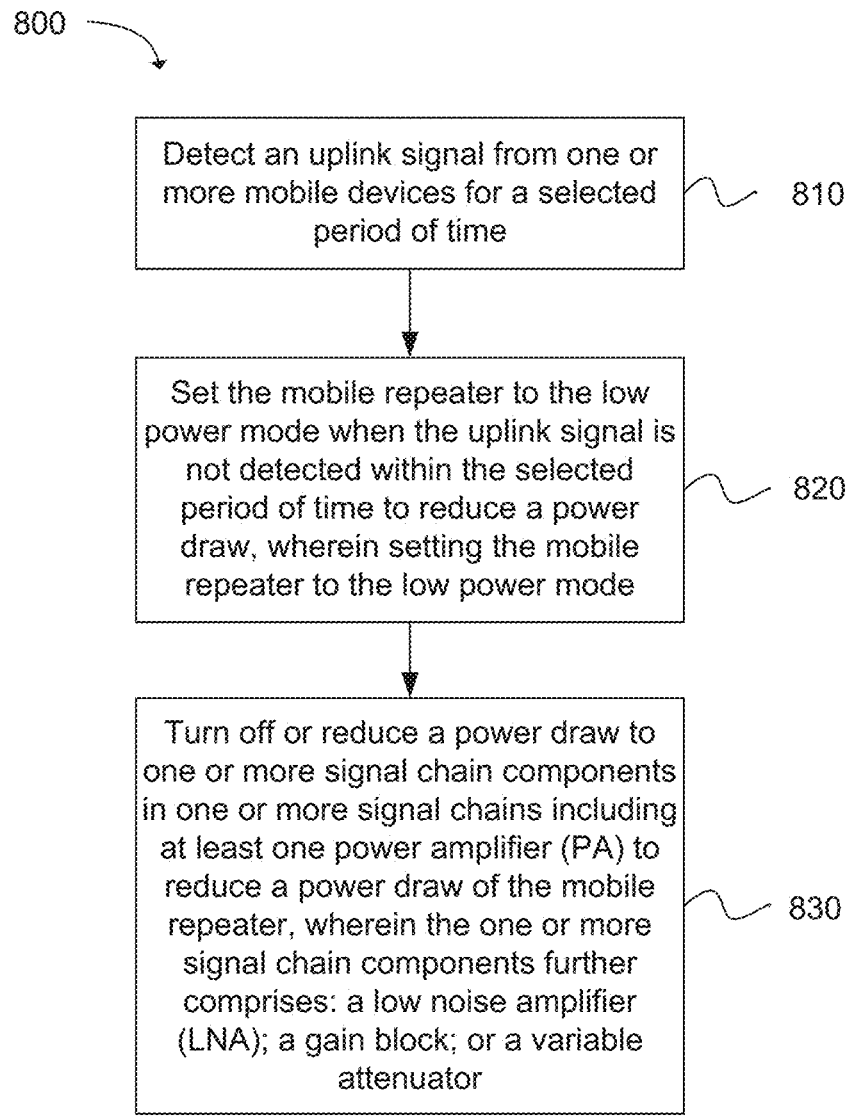
FIG. 8 illustrates functionality of a mobile repeater operable to operate in a low power mode, in accordance with an example.

FIG. 8 illustrates functionality 800 of a mobile repeater operable to operate in a low power mode. The mobile repeater can comprise one or more processors configured to detect an uplink signal from one or more mobile devices over a selected period of time 810. The mobile repeater can comprise one or more processors configured to set the mobile repeater to the low power mode when the uplink signal is not detected within the selected period of time to reduce a power draw 820. Setting the mobile repeater to the low power mode can comprise: turning off one or more signal chain components in one or more signal chains including at least one power amplifier (PA) to reduce a power draw of the mobile repeater. The one or more signal chain components can further comprise a low noise amplifier (LNA), a gain block, or a variable attenuator 830 that can be turned off in a low power mode.

In one embodiment, the one or more processors are further configured to detect the uplink signal having a power level greater than a selected threshold level during the selected period of time, and set the mobile repeater to a full power mode when the uplink signal has the power level that is higher than the selected threshold over the selected period of time.

In one embodiment the one or more signal chain components further comprises: a signal detector, a processor, a controller, or an active component.

In one embodiment, the one or more processors are further configured to: set the mobile repeater to the low power mode, comprising: power one or more signal chain components in one or more signal chains for a selected duty cycle to reduce a power draw of the mobile repeater. The one or more signal chain components can comprise: a low noise amplifier (LNA); a power amplifier (PA); and a gain block.

In one embodiment, the one or more signal chains can include one or more uplink signal chains or one or more downlink signal chains.

In one embodiment, the one or more processors are further configured to: set the mobile repeater to a normal power mode when the uplink signal is detected within the selected period of time.

In one embodiment, the mobile repeater is a mobile vehicle repeater configured to operate in a vehicle.

In one embodiment, the mobile vehicle repeater is configured to reduce a power draw on the vehicle by setting the mobile repeater to the low power mode when the uplink signal is not detected within the selected period of time.

In one embodiment, the mobile repeater is powered by a vehicle battery.

In one embodiment, the mobile repeater is configured to reduce a power draw on the vehicle battery by setting the mobile repeater to the low power mode when the uplink signal is not detected within the selected period of time.

In one embodiment, the mobile repeater is configured to connect to the battery via a direct current (DC) power adapter.

In one embodiment, the DC power adapter is one or more of a cigarette lighter adapter (CLA), a universal serial bus (USB) adapter, or an alternating current (AC) to DC adapter.

In one embodiment, the DC power adapter is configured to: determine when the battery is not being charged; and send a signal to the mobile repeater to set the mobile repeater to the low power mode to reduce a power draw on the battery when the battery is not being charged.

In one embodiment, the mobile repeater is configured to connect to the battery via the DC power adapter, wherein the DC power adapter comprises one or more voltage adapter processors. The one or more voltage adapter processors are configured to determine an average DC voltage at the DC power adapter; identify, as a voltage anomaly, a voltage increase over a selected voltage change period of time that is greater than the average DC voltage by a predetermined voltage threshold; determine that the battery is not being charged when the voltage anomaly does not occur for a selected voltage anomaly period of time; and send a voltage anomaly signal to the mobile repeater to set the mobile repeater to a voltage anomaly low power mode to reduce a power draw on the battery when the battery is not being charged.

In one embodiment, the voltage anomaly low power mode is different than the low power mode.

In one embodiment, the one or more processors are further configured to set the mobile repeater to the voltage anomaly low power mode comprising: receive the voltage anomaly signal at the mobile repeater from the DC voltage adapter; power one or more signal chain components in one or more signal chains of the mobile repeater for a selected duty cycle to reduce a power draw of the mobile repeater on the battery when the battery is not being charged. The one or more signal chain components can comprise: a low noise amplifier (LNA); a power amplifier (PA); a gain block; a band pass filter; or an attenuator.

In one embodiment, the one or more processors are further configured to set the mobile repeater to the voltage anomaly low power mode comprising: receive the voltage anomaly signal at the mobile repeater from the DC voltage adapter; turn off or reduce a power draw of one or more signal chain components in one or more signal chains of the mobile repeater to reduce a power draw of the mobile repeater on the battery when the battery is not being charged. The one or more signal chain components can comprise a low noise amplifier (LNA); a power amplifier (PA); or a gain block.

Figure 9:
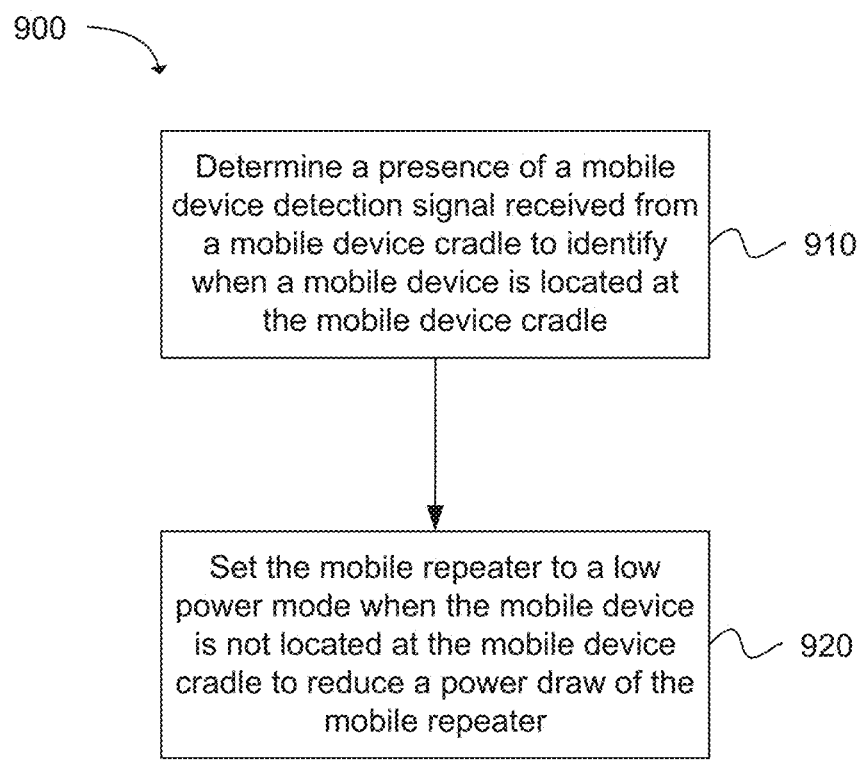
FIG. 9 illustrates functionality of a mobile repeater coupled to a mobile device cradle operable to operate in a low power mode, the mobile repeater, in accordance with an example.

FIG. 9 illustrates functionality 900 of a mobile repeater coupled to a mobile device cradle operable to operate in a low power mode. The mobile repeater can comprise one or more processors configured to determine a presence of a mobile device detection signal received from a mobile device cradle to identify when a mobile device is located at the mobile device cradle 910. The mobile repeater can comprise one or more processors configured to set the mobile repeater to a low power mode when the mobile device is not located at the mobile device cradle to reduce a power draw of the mobile repeater 920.

In one embodiment, the one or more processors are further configured to determine a presence of the mobile device at the mobile device cradle, comprising: detect the mobile device detection signal configured to identify that the mobile device is not located at the mobile device cradle; or determine the mobile device detection signal is not received for a selected threshold period of time to identify that the mobile device is not present at the mobile device cradle.

In one embodiment, the one or more processors are further configured to transmit a mobile device detection signal from the mobile repeater to an antenna coupled to the mobile device cradle; measure a return loss of the mobile device detection signal; determine a presence of the mobile device at the mobile device cradle based on the return loss; and set the mobile repeater to the low power mode when the mobile device is not present.

Figure 10:
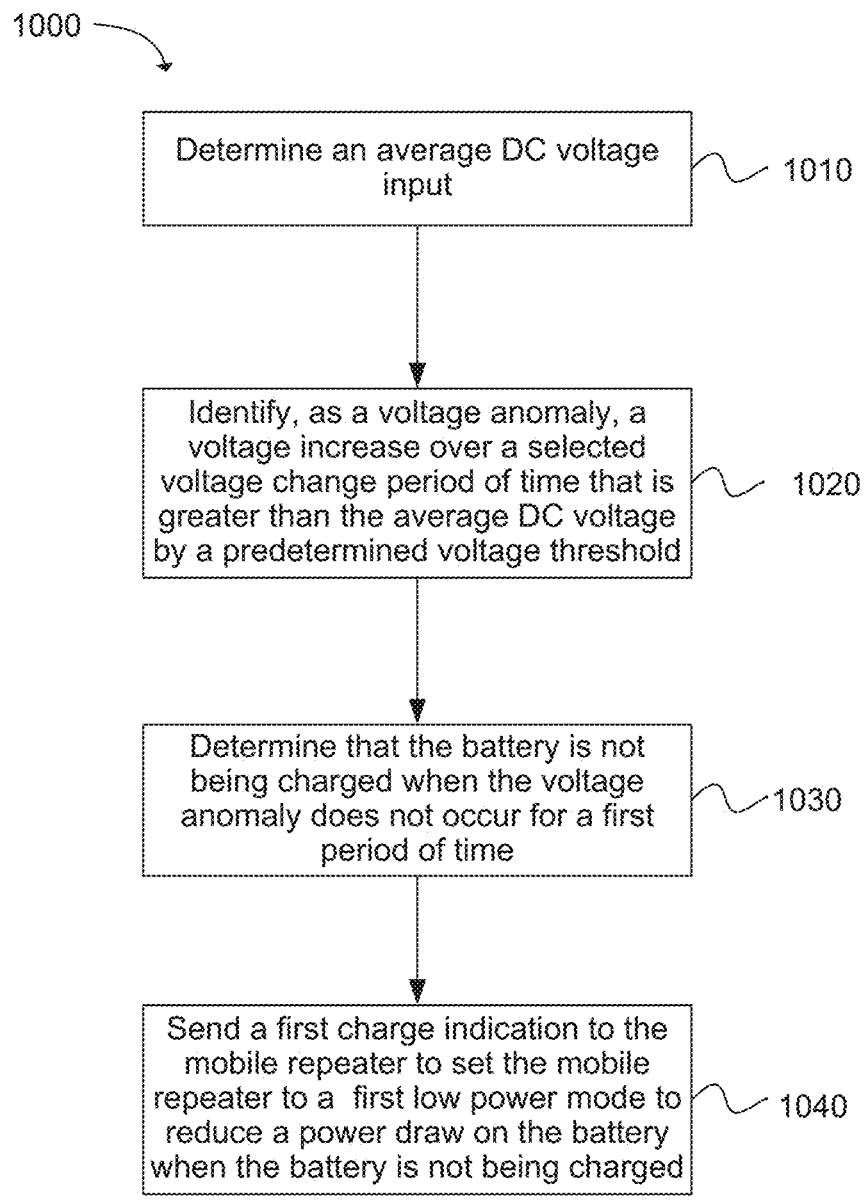
FIG. 10 illustrates functionality of a power adapter for a mobile repeater for reducing battery power consumption, in accordance with an example.

FIG. 10 illustrates functionality 1000 of a power adapter for a mobile repeater for reducing battery power consumption. The power adapter can comprise one or more voltage adapter processors configured to determine an average DC voltage input 1010. The power adapter can comprise one or more voltage adapter processors configured to identify, as a voltage anomaly, a voltage increase over a selected voltage change period of time that is greater than the average DC voltage by a predetermined voltage threshold 1020. The power adapter can comprise one or more voltage adapter processors configured to determine that the battery is not being charged when the voltage anomaly does not occur for a first period of time 1030. The power adapter can comprise one or more voltage adapter processors configured to send a first charge indication to the mobile repeater to set the mobile repeater to a first low power mode to reduce a power draw on the battery when the battery is not being charged 1040.

In one embodiment, the one or more voltage adapter processors are further configured to send the charge indication to the mobile repeater from the power adapter to enable the mobile repeater to power one or more signal chain components in one or more uplink signal chains or one or more downlink signal chains of the mobile repeater for a selected duty cycle to reduce a power draw of the mobile repeater on the battery when the battery is not being charged. The one or more signal chain components can comprise a low noise amplifier (LNA), a power amplifier (PA), or a gain block.

In one embodiment, the one or more voltage adapter processors are further configured to send a second charge indication to the mobile repeater from the power adapter after a second period of time that is greater than the first period of time to enable the mobile repeater to turn off or reduce a power draw of one or more signal chain components in one or more uplink signal chains or one or more downlink signal chains of the mobile repeater to further reduce a power draw of the mobile repeater on the battery when the battery is not being charged for the second period of time. The one or more signal chain components can comprise a low noise amplifier (LNA), a power amplifier (PA), a gain block, a processor, a controller or an attenuator.

Figure 11:
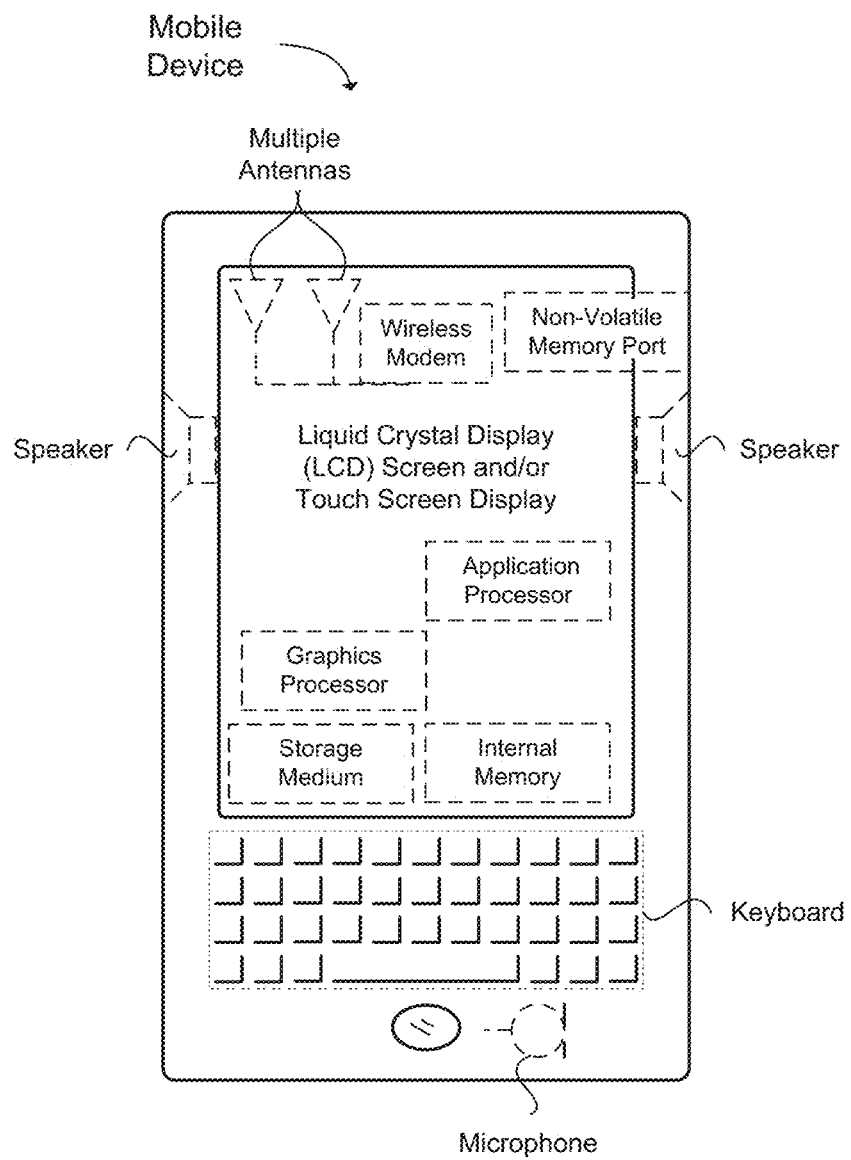
FIG. 11 illustrates a diagram of a wireless device (e.g., UE) in accordance with an example.

FIG. 11 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

The outlined steps and operations are only provided as examples, and some of the steps and operations may be optional, combined into fewer steps and operations, or expanded into additional steps and operations without detracting from the essence of the disclosed embodiments.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations can be made hereto without departing from the spirit and scope of the invention.

What is claimed is:

1. A mobile repeater configured to be powered by a battery, the mobile repeater operable to operate in a low power mode, the repeater comprising:
one or more processors configured to:
detect an uplink signal from one or more mobile devices for a selected period of time;
set the mobile repeater to the low power mode when the uplink signal is not detected within the selected period of time to reduce a power draw, wherein setting the mobile repeater to the low power mode comprises:
turn off or reduce a power draw of one or more signal chain components in one or more signal chains including at least one power amplifier (PA) to reduce a power draw of the mobile repeater; and
a memory coupled to the one or more processors and configured to store a detection of the uplink signal;
wherein the mobile repeater is configured to connect to the battery via a direct current (DC) power adapter; and
wherein the DC power adapter comprises:
one or more voltage adapter processors configured to:
determine a DC voltage measured over a period of time at the DC power adapter;
identify, as a voltage anomaly, a voltage increase over a selected voltage change period of time that is greater than the DC voltage by a predetermined voltage threshold; and
determine that the battery is not being charged when the voltage anomaly does not occur for a selected voltage anomaly period of time.

2. The mobile repeater of claim 1, wherein the one or more processors are further configured to:
detect the uplink signal having a power level greater than a selected threshold for the selected period of time; and
set the mobile repeater to full power mode when the uplink signal has the power level that is higher than the selected threshold for the selected period of time.

3. The mobile repeater of claim 1, wherein the one or more signal chain components further comprises:
a low noise amplifier (LNA);
a gain block;
a variable attenuator;
a signal detector;
a processor;
a controller; or
an active component.

4. The mobile repeater of claim 3, wherein the one or more signal chains include one or more uplink signal chains, or one or more downlink signal chains.

5. The mobile repeater of claim 1, wherein the one or more processors are further configured to:
set the mobile repeater to the low power mode, comprising:
power one or more signal chain components in one or more signal chains for a selected duty cycle to reduce a power draw of the mobile repeater, wherein the one or more signal chain components comprises:
a low noise amplifier (LNA);
a power amplifier (PA); and
a gain block.

6. The mobile repeater of claim 5, wherein the one or more signal chains include one or more uplink signal chains, or one or more downlink signal chains.

7. The mobile repeater of claim 1, wherein the one or more processors are further configured to:
set the mobile repeater to a normal power mode when the uplink signal is detected within the selected period of time.

8. The mobile repeater of claim 1, wherein the mobile repeater is a mobile vehicle repeater configured to operate in a vehicle.

9. The mobile repeater of claim 8, wherein the mobile vehicle repeater is configured to reduce a power draw on the vehicle by setting the mobile repeater to the low power mode when the uplink signal is not detected within the selected period of time.

10. The mobile repeater of claim 1, wherein the mobile repeater is configured to reduce a power draw on the battery by setting the mobile repeater to the low power mode when the uplink signal is not detected within the selected period of time.

11. The mobile repeater of claim 1, wherein the DC power adapter is one or more of a cigarette lighter adapter (CLA), a universal serial bus (USB) adapter, or an alternating current (AC) to DC adapter.

12. The mobile repeater of claim 1, wherein the DC power adapter is configured to:
determine when the battery is not being charged; and
send a signal to the mobile repeater to set the mobile repeater to the low power mode to reduce a power draw on the battery when the battery is not being charged.

13. The mobile repeater of claim 12, wherein the DC power adapter is configured to:
send the signal to the mobile repeater, after a selected time period, to set the mobile repeater to the low power mode to reduce the power draw on the battery.

14. The mobile repeater of claim 1, wherein the one or more voltage adapter processors are further configured to:
send a voltage anomaly signal to the mobile repeater to set the mobile repeater to a voltage anomaly low power mode to reduce a power draw on the battery when the battery is not being charged.

15. The mobile repeater of claim 14, wherein the voltage anomaly low power mode is different than the low power mode.

16. The mobile repeater of claim 14, wherein the one or more processors are further configured to set the mobile repeater to the voltage anomaly low power mode comprising:
receive the voltage anomaly signal at the mobile repeater from the DC voltage adapter; and
power one or more signal chain components in one or more signal chains of the mobile repeater for a selected duty cycle to reduce a power draw of the mobile repeater on the battery when the battery is not being charged, wherein the one or more signal chain components comprises:
a low noise amplifier (LNA);
a power amplifier (PA);
a gain block; or
an attenuator.

17. The mobile repeater of claim 14, wherein the one or more processors are further configured to set the mobile repeater to the voltage anomaly low power mode comprising:
receive the voltage anomaly signal at the mobile repeater from the DC voltage adapter;
turn off or reduce power draw of one or more signal chain components in one or more signal chains of the mobile repeater to reduce a power draw of the mobile repeater on the battery when the battery is not being charged, wherein the one or more signal chain components comprises:
a low noise amplifier (LNA);
a power amplifier (PA); or
a gain block.

18. At least one non-transitory machine readable storage medium having instructions embodied there on for operating a repeater configured to be powered by a battery in a lower power mode, the instruction when executed by one or more processors at the repeater perform the following:
detecting an uplink signal from one or more cell phones for a selected period of time;
setting the repeater to the low power mode when the uplink signal is not detected within the selected period of time to reduce a power draw on a vehicle;
wherein the repeater is configured to connect to the battery via a direct current (DC) power adapter; and
wherein the DC power adapter comprises:
one or more voltage adapter processors configured to:
determine a DC voltage measured over a period of time at the DC power adapter;
identify, as a voltage anomaly, a voltage increase over a selected voltage change period of time that is greater than the DC voltage by a predetermined voltage threshold; and
determine that the battery is not being charged when the voltage anomaly does not occur for a selected voltage anomaly period of time.

19. The at least one non-transitory machine readable storage medium of claim 18, further comprising instructions when executed by the one or more processors perform the following:
detecting the uplink signal having a power level greater than a selected threshold for the selected period of time; and
setting the repeater to full power mode when the uplink signal having the power level higher than the selected threshold for the selected period of time.

20. The at least one non-transitory machine readable storage medium of claim 18, further comprising instructions when executed by the one or more processors perform the following:
setting the repeater to the low power mode, comprising:
turning off or reduce a power draw of one or more signal chain components in one or more signal chains of the repeater to reduce a power draw of the repeater, wherein the one or more signal chain components comprises:
a low noise amplifier (LNA);
a power amplifier (PA);

a gain block;
a band pass filter; and
an attenuator.

21. The at least one non-transitory machine readable storage medium of claim 18, further comprising instructions when executed by the one or more processors perform the following:
setting the repeater to the low power mode, comprising:
powering one or more signal chain components in one or more signal chains of the repeater for a selected duty cycle to reduce a power draw of the repeater, wherein the one or more signal chain components comprises:
a low noise amplifier (LNA);
a power amplifier (PA); and
a gain block.

22. The at least one non-transitory machine readable storage medium of claim 18, further comprising instructions when executed by the one or more processors perform the following:
setting the repeater to a normal power mode when the uplink signal is detected within the selected period of time.

23. A mobile repeater configured to be powered by a battery, the mobile repeater operable to operate in a low power mode, the repeater comprising:
a direct current (DC) power adapter configured to connect the mobile repeater to the battery;
wherein the DC power adapter comprises:
one or more voltage adapter processors configured to:
determine a DC voltage measured over a period of time at the DC power adapter;
identify, as a voltage anomaly, a voltage increase over a selected voltage change period of time that is greater than the DC voltage by a predetermined voltage threshold; and
determine that the battery is not being charged when the voltage anomaly does not occur for a selected voltage anomaly period of time; and
receive a signal at the mobile repeater from the power adapter to set the mobile repeater to a low power mode to reduce a power draw on the battery when the battery is not being charged.

24. The mobile repeater of claim 23, wherein the mobile repeater further comprises:
one or more processors configured to:
detect an uplink signal from one or more mobile devices for a selected period of time;
set the mobile repeater to the low power mode when the uplink signal is not detected within the selected period of time to reduce a power draw, wherein setting the mobile repeater to the low power mode comprises:
turn off or reduce a power draw of one or more signal chain components in one or more signal chains including at least one power amplifier (PA) to reduce a power draw of the mobile repeater, wherein the one or more signal chain components further comprises:
a low noise amplifier (LNA);
a gain block; or
a variable attenuator; and
a memory coupled to the one or more processors and configured to store a detection of the uplink signal.

25. The mobile repeater of claim 23, wherein the DC power adapter is configured to:
send the signal to the mobile repeater, after a selected time period, to set the mobile repeater to the low power mode to reduce the power draw on the battery.

26. The mobile repeater of claim 23, wherein the one or more voltage adapter processors are further configured to:
send a voltage anomaly signal to the mobile repeater to set the mobile repeater to a voltage anomaly low power mode to reduce a power draw on the battery when the battery is not being charged.

27. The mobile repeater of claim 26, wherein the voltage anomaly low power mode is different than the low power mode.

28. The mobile repeater of claim 26, wherein the one or more processors are further configured to set the mobile repeater to the voltage anomaly low power mode comprising:
receive the voltage anomaly signal at the mobile repeater from the DC voltage adapter; and
power one or more signal chain components in one or more signal chains of the mobile repeater for a selected duty cycle to reduce a power draw of the mobile repeater on the battery when the battery is not being charged, wherein the one or more signal chain components comprises:
a low noise amplifier (LNA);
a power amplifier (PA);
a gain block; or
an attenuator.

29. The mobile repeater of claim 26, wherein the one or more processors are further configured to set the mobile repeater to the voltage anomaly low power mode comprising:
receive the voltage anomaly signal at the mobile repeater from the DC voltage adapter;
turn off or reduce power draw of one or more signal chain components in one or more signal chains of the mobile repeater to reduce a power draw of the mobile repeater on the battery when the battery is not being charged, wherein the one or more signal chain components comprises:
a low noise amplifier (LNA);
a power amplifier (PA); or
a gain block.

30. The mobile repeater of claim 23, wherein the DC power adapter is one or more of a cigarette lighter adapter (CLA), a universal serial bus (USB) adapter, or an alternating current (AC) to DC adapter.

31. The mobile repeater of claim 23, wherein the DC voltage measured over the period of time at the DC power adapter is an average DC voltage measured over the period of time.

32. The mobile repeater of claim 1, wherein the DC voltage over the period of time at the DC power adapter is an average DC voltage measured over the period of time.

33. The at least one non-transitory machine readable storage medium of claim 18, wherein the repeater is a mobile repeater.

34. The at least one non-transitory machine readable storage medium of claim 18, wherein the repeater is a vehicle repeater.

35. The at least one non-transitory machine readable storage medium of claim 18, wherein the DC voltage measured over the period of time at the DC power adapter is an average DC voltage measured over the period of time.

* * * * *